Jan. 9, 1951  J. J. PILLIOD  2,537,546
COMBINED FISH SCALER AND SHIELD
Filed March 17, 1948
FIG. 1
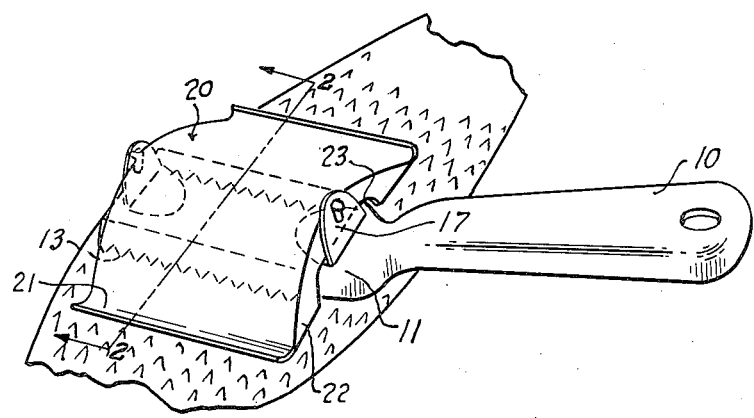
FIG. 2.
FIG. 4.
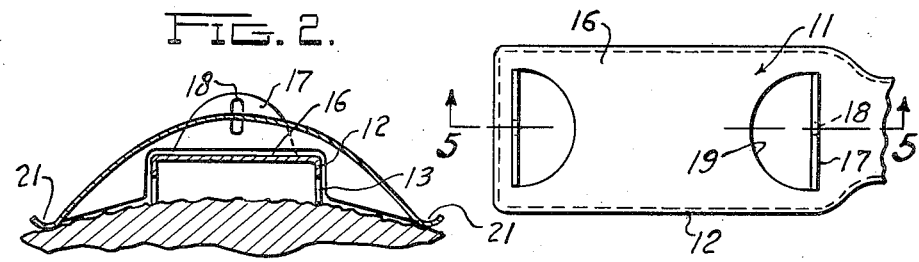
FIG. 3.
FIG. 5.
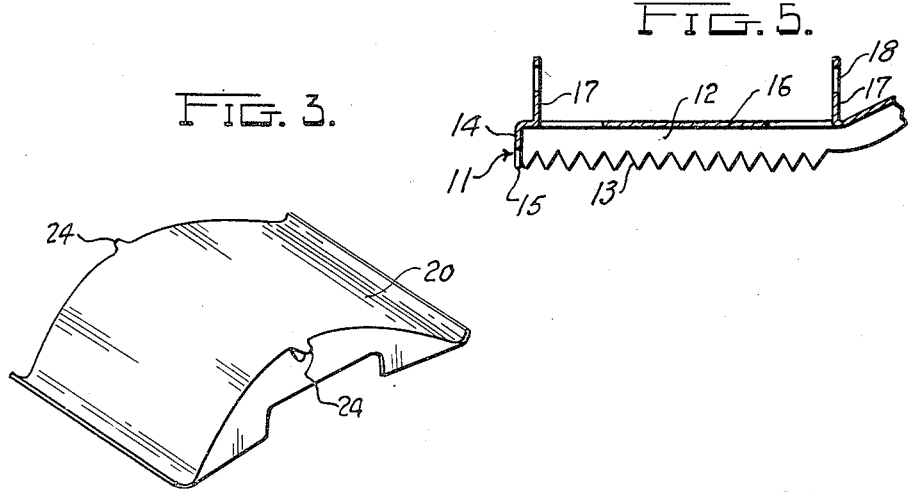
INVENTOR.
Jules J. Pilliod
BY
ATTORNEY Patented Jan. 9, 1951

2,537,546

UNITED STATES PATENT OFFICE 2,537,546

COMBINED FISH SCALER AND SHIELD

Jules J. Pilliod, Toledo, Ohio

Application March 17, 1948, Serial No. 15,443

7 Claims. (Cl. 17—7)

This invention relates to a hand-operated fish scaler, and an object is to produce a new and improved fish scaler of this type equipped with a hood for preventing the scales from being thrown during the scaling operation and which may be inexpensively produced from sheet metal stampings.

Another object is to produce a fish scaler on which is conveniently mounted a hood or shield so designed that during the to and fro movement of the scaler, the hood rides along the body of the fish and collects the scales, thus militating against their being thrown in one direction or another.

A further object is to produce a simple and inexpensive fish scaler assembly which is sturdy in construction, reliable in operation, and lends itself admirably to large scale production.

Other objects and advantages will hereinafter appear, and for purposes of illustration but not of limitation, an embodiment of the invention is shown in the accompanying drawings in which:

Figure 1 is a top perspective view of the scaler equipped with a hood or shield applied in position of use;

Figure 2 is a transverse sectional view of the scaler taken on the line 2—2 of Figure 1;

Figure 3 is a top plan view of the hood removed from the scaler;

Figure 4 is a top plan view of the scaler head showing the brackets on which the hood or shield is mounted; and Figure 5 is a longitudinal sectional elevation on the line 5—5 of Figure 4.

The illustrated embodiment of the invention comprises a fish scaler formed from a sheet metal stamping and having an elongate handle 10 with which a scaling head 11 is integral. The head 11 is formed with integral downturned side edge flanges 12 formed with teeth 13 and an outer end flange 14 similarly provided with teeth 15. The flanges 12 and 14 are turned down from a relatively flat body 16.

Struck from the body 16 of the scaler at opposite ends thereof are curved brackets 17. The brackets are bent upwardly to lie at substantially right angles to the body 16 of the head and each bracket is formed adjacent its upper end portion with a relatively short, vertically elongate slot 18. Manifestly, in striking out the brackets 17, apertures 19 of semicircular form and reversely disposed, are formed in the body 16.

The brackets 17 provide a mounting for a shield or hood 20 which is likewise formed of a sheet metal stamping. The shield 20, as shown, is of generally arched form, providing a gentle slope to opposite sides of the scaler head 11, the opposite sides being curved upwardly as indicated at 21, to provide runners or curved surfaces to slide freely over the body of the fish during the scaling operation.

Formed on opposite ends of the shield are side walls or flanges 22, the lower edges of which are substantially in alignment with the curved edges 21 except for the central portion which is cut out, as indicated at 23, to fit over the head of the scaler, the cut-out portion 23 being sufficient to allow space on opposite sides of the scaler to afford a limited amount of rocking movement of the scaler relative to the shield. The side walls 22 of the shield fit between the upright brackets 17, and formed on the upper portion of the side walls 22 of the shield, approximately centrally thereof are struck-out tits 24 to fit into the slots 18 in the brackets thereby affording a lost motion connection between the brackets 17 and the shield. The brackets 17 are sufficiently springy so that they may be flexed to enable the tits 24 to enter the slots 18. Due to the vertical elongation of the slots 18, a limited vertical movement or lost motion of the shield 20 with respect to the scaler is provided.

From the above description, it will be manifest that I have produced an exceedingly simple and efficient scaler with which, by a lateral to and fro movement, scaling can be expeditiously accomplished, the shield sliding freely over the body of the fish and collecting the scales inside thereof. The side walls 22 cooperate with the body of the shield to prevent the scales from flying outwardly during scaling. The extreme simplicity of the structure, both from a manufacturing as well as an assembling standpoint, enables the assembly to be produced inexpensively in large scale production.

It is to be understood that numerous changes in details of construction, arrangement and operation may be effected without departing from the spirit of the invention especially as defined in the appended claims.

What I claim is:

1. A fish scaler comprising a sheet metal scaling head, a pair of spaced brackets on said head, a shield of arched form fitting over said head and having opposite edge portions engageable with the body of the fish to be scaled, and a pivotal connection between said shield and said brackets respectively.

2. A fish scaler comprising a sheet metal scaling head, a pair of spaced brackets on said head, a shield of arched form fitting over said head and having opposite edge portions engageable with the body of the fish to be scaled, end walls on said shield partially embracing said head, and a pivotal connection between said shield and said brackets respectively.

3. A fish scaler comprising a sheet metal scaling head, a handle integral with the head, bracket means on said head, an arched shield overlying said head and spaced therefrom, the side edge portions of said shield being curved upwardly to ride freely over the body of the fish to be scaled, and a connection between said shield and said bracket means enabling rocking movement of the shield relative thereto during the scaling operation.

4. A fish scaler comprising a sheet metal scaling head, a handle integral with the head, bracket means on said head, an arched shield overlying said head and spaced therefrom, the side edge portions of said shield being curved upwardly to ride freely over the body of the fish to be scaled, end walls on said shield having centrally disposed cut-out portions to accommodate said scaling head, and a connection between said shield and said bracket means enabling rocking movement of the shield relative thereto during the scaling operation.

5. A fish scaler comprising a sheet metal scaling head, a handle integral with the head, bracket means on said head, an arched shield overlying said head and spaced therefrom, the side edge portions of said shield being curved upwardly to ride freely over the body of the fish to be scaled, end walls on said shield having centrally disposed cut-out portions to accommodate said scaling head, and a lost motion connection between the end walls and said bracket means enabling rocking movements of said shield relative to said head and also vertical movements thereof.

6. A fish scaler comprising a sheet metal scaling head having a flat body and depending scaling teeth, a pair of brackets integral with said body and extending upwardly therefrom in longitudinally spaced relation, an arched shield fitting over said head with the edge portions thereof engageable with the body of the fish to be scaled, end walls on said shield, and means providing a lost motion connection between said end walls and said brackets respectively, enabling rocking movement of said shield relative to said head and also vertical movement thereof.

7. A fish scaler comprising a sheet metal scaling head having a flat body and depending scaling teeth, a pair of brackets integral with said body and extending upwardly therefrom in longitudinally spaced relation, an arched shield fitting over said head with the edge portions thereof engageable with the body of the fish to be scaled, end walls on said shield, means providing a lost motion connection between said end walls and said brackets respectively, enabling rocking movement of said shield relative to said head and also vertical movement thereof, said brackets having vertically elongate slots, and tits struck out of said end walls respectively and engaging in said slots to enable rocking and vertical sliding movement of the shield relative to the head.

JULES J. PILLIOD.

REFERENCES CITED

The following references are of record in the file of this patent:

UNITED STATES PATENTS

| Number | Name | Date |
|---|---|---|
| 787,037 | Hackett et al. | Apr. 11, 1905 |
| 1,000,073 | Clarke | Aug. 8, 1911 |
| 1,440,960 | Brown et al. | Jan. 2, 1923 |
| 2,109,859 | Cope | Mar. 1, 1938 |
| 2,435,351 | Hay | Feb. 3, 1948 |